United States Patent [19]

Butin et al.

[11] 4,031,327
[45] June 21, 1977

[54] TELEPHONE SET AND SYSTEM UTILIZING FREQUENCY DIVISION MULTIPLEXING

[75] Inventors: Henri Butin; Pierre Deman, both of Paris, France

[73] Assignee: Thomson-CSF, Paris, France

[22] Filed: Apr. 6, 1976

[21] Appl. No.: 674,676

[30] Foreign Application Priority Data

Apr. 11, 1975 France .............................. 75.11311

[52] U.S. Cl. ......................... 179/15 FD; 179/2.5 R
[51] Int. Cl.² ........................................... H04J 1/06
[58] Field of Search ........ 179/15 FD, 15 FS, 2.5 R, 179/15 AL; 325/184

[56] References Cited

UNITED STATES PATENTS

| | | | |
|---|---|---|---|
| 3,809,815 | 5/1974 | Reed ............................. | 179/15 FD |
| 3,864,521 | 2/1975 | DeLong ......................... | 179/15 FD |

*Primary Examiner*—Kathleen H. Claffy
*Assistant Examiner*—Joseph A. Popek
*Attorney, Agent, or Firm*—Cushman, Darby & Cushman

[57] ABSTRACT

The telephone set comprises a programmable carrier generator which supplies the same variable frequency to an amplitude modulator receiving the local voice signals, and to a synchronous demodulator which makes it possible to reconstitute, without band pass filtering, the voice signals of any set with which it is communicating among those of other sets. The double side band amplitude modulated signals supplied by each set are frequency-division multiplexed on one of the two ways of a telephone artery, the other way of which distributes them to the sets after conversion of all the carrier frequencies into conjugate frequencies thereof. The programmable generators of the calling and called users in communication are respectively tuned to the frequencies of such a pair of conjugate frequencies.

3 Claims, 2 Drawing Figures

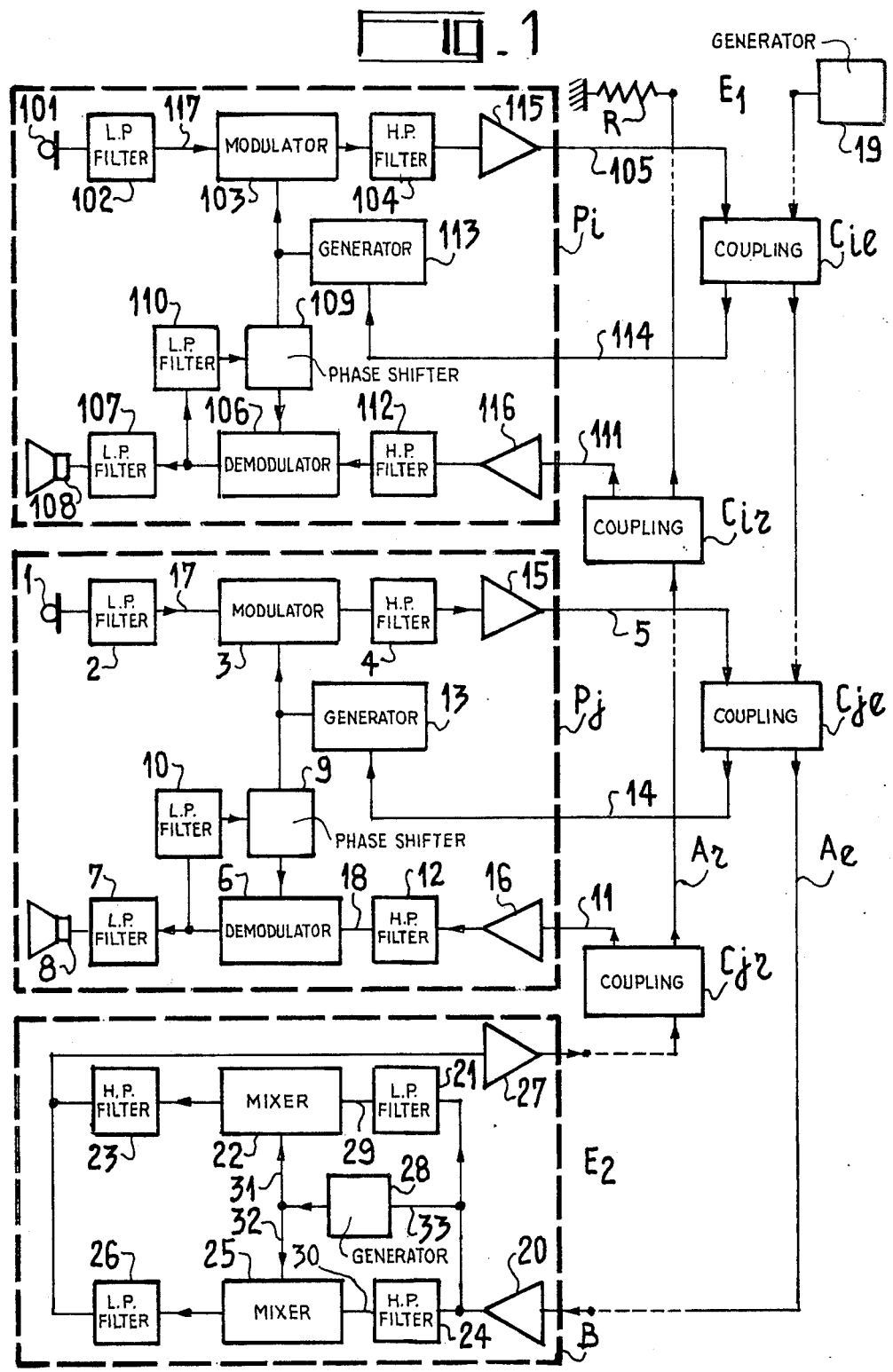

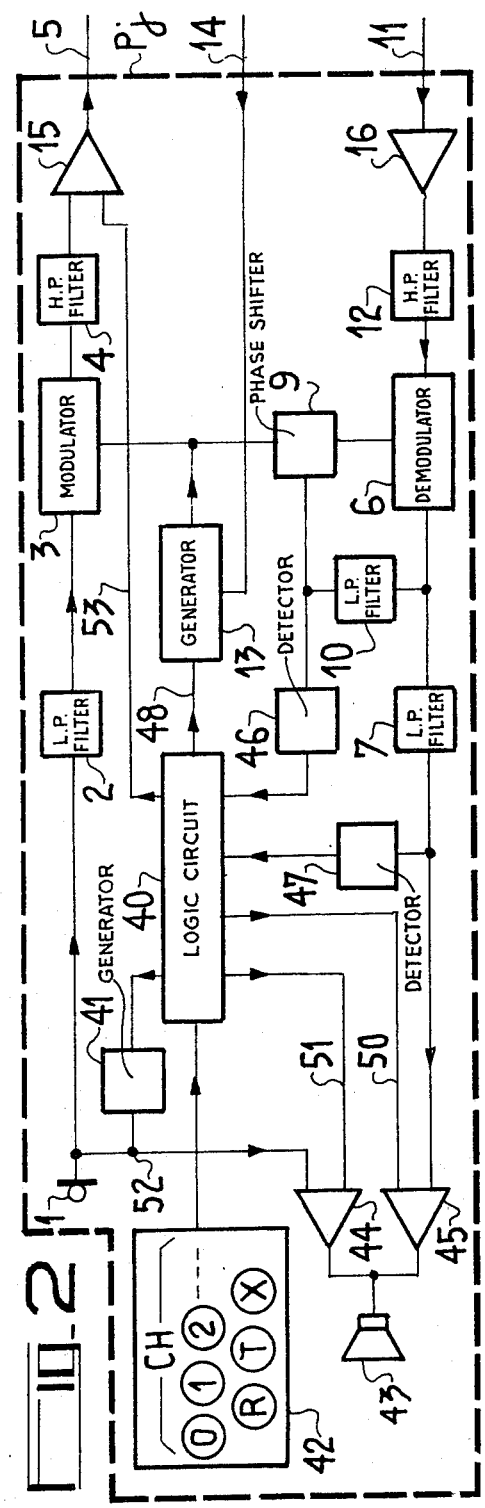

TELEPHONE SET AND SYSTEM UTILIZING FREQUENCY DIVISION MULTIPLEXING

The present invention relates to telephone sets and to the telephone systems which utilize them, in particular intercom arrangements, in which the channels of the users are multiplexed.

It is known to design systems of this kind in which the telephone communications from the different sets are multiplexed by frequency distribution techniques using the principle of single side-band amplitude modulation.

An arrangement of this kind has the serious drawbacks that it is expensive and bulky in application to a telephone system since it requires, in each direction of transmission, high-efficiency band filtering, and, frequently, two successive frequency conversions.

The object of the present invention is to overcome these drawbacks by simplifying the circuits of the channels associated with each telephone set in the telephone system, in particular by eliminating the band filters.

According to the invention, there is provided a telephone set having first and second inputs and an output, and comprising a transmitter channel for delivering to said output a variable carrier frequency output signal with double side-band amplitude modulation and carrier component and a receiver channel having an input coupled to said telephone set first input for receiving a multiplex high frequency signal including, when said set is being used for communication, a multiplexed signal having the same carrier frequency as said output signal with double side-band amplitude modulation and carrier component;

said transmitter channel comprising: a programmable generator having an output, for supplying said output signal variable carrier frequency, and a sync input; and an amplitude modulating having a first input for receiving voice signals, a second input and an output; said sync input being coupled to said second input of said telephone set for receiving a reference frequency, said second input of said modulator being coupled to said generator output, and said modulator output being coupled to said telephone set output;

said receiver channel comprising: an electroacoustic transducer, a synchronous demodulator having a first input coupled to said receiver channel input for receiving said multiplex high signal, a second input and an output for delivering to said transducer the modulating signal from said multiplexed signal and a control direct voltage; and a variable phase-shifter having a signal input coupled to said generator output, a control input coupled for receiving said control direct voltage and an output coupled to said demodulator second input.

According to the invention, there is further provided a telephone system comprising at a two-way telephone artery and $m$ ($m>2$) telephone sets as defined hereinabove.

The invention will be better understood and others of its features rendered apparent from a consideration of the ensuing description and related drawings in which:

FIG. 1 is the diagram of an embodiment of an telephone set according to the invention and a telephone system utilising same;

FIG. 2 is the detailed diagram of a telephone set according to the invention.

In FIG. 1 a telephone artery formed by a first cable $A_e$ and a second cable $A_r$ is shown. To this artery $m$ telephone sets are coupled ($m>2$), of which two sets $P_i$ and $P_j$ are shown in the drawing.

Cable $A_e$ is used to collect the telephone signals from the sets, and cable $A_r$, coupled to cable $A_e$ as will be indicated later on, to distribute the telephone signals to the sets. In addition, cable $A_e$ is used to distribute to the sets a synchronizing signal in the form of a reference frequency.

The sets are coupled to the cables $A_e$ and $A_r$ of the artery by means of first and second coupling arrangements, $C_{ie}$ and $C_{ir}$ as concerns set $P_i$, and $C_{je}$ and $C_{jr}$ as concerns set $P_j$.

The connections to the cables are identical for all the sets and will be described only for set $P_j$.

The coupling arrangement $C_{je}$ has a first input coupled to the input section, in set $P_j$, of the cable $A_e$, and a second input coupled to the output 5 of set $P_j$, a first output coupled to the output section of cable $A_e$, and a second output coupled to a sync. input 14 of the set.

Coupling arrangement $C_{je}$ sums the signals applied to its two inputs, and delivers the sum signal at its first output, and, by means of a filter, the sync signal at its second output.

Coupling arrangement $C_{jr}$ has a single input connected to the input section of the cable $A_r$, a first output coupled to the output section of this cable, and a second output coupled to the signal input of set $P_j$.

The telephone set $P_j$ comprises:

an amplitude modulator 3, supplied at its signal input 17 from a microphone 1 through a low-pass filter 2 and itself supplying the output 5 of the set $P_j$ through a high-pass filter 4 followed by an amplifier 15; and modulator supplies a double side-band modulated carrier, with the carrier component.

a synchronous demodulator 6, supplied at its first input 18 from the signal input 11 of the set $P_j$ through an amplifier 16 followed by a high-pass filter 12, and itself supplying a loudspeaker 8 through a low-pass filter 7, and controlling a phase-shift device 9 through a low-pass filter 10;

a programmable carrier frequency generator 13 connected to the sync input 14 of the set $P_j$ and itself supplying in parallel the carrier input of the modulator 3 and that of the demodulator 6, through the phase-shift device 9.

The set $P_i$ comprises a circuit similar to $P_j$ and its elements are marked by the same numbers as the corresponding elements of $P_j$, increased by 100.

The artery has a first end $E_1$ formed by the input of the cable $A_e$, this being supplied by the generator 19, and the output of the cable $A_r$ which is terminated in its characteristic impedance R, and a second end $E_2$ connected to a terminal circuit whose input is the output of cable $A_e$ and whose output is the input of cable $A_r$.

The circuit B comprises two mixers 22 and 25 which are supplied at their first inputs 29 and 30 with the output signal from an input amplifier-separator 20, respectively through a low-pass filter 21 and a high-pass filter 24. The mixers 22 and 25 supply an output amplifier-separator 27 in parallel respectively through a high-pass filter 23 and a low-pass filter 26.

A generator 28 supplies the second inputs 31 and 32 of the mixers 22 and 25 in parallel, and is itself supplied at the terminal 33 with the reference frequency from the generator 19, normally supplied by the first output of the first coupling arrangement of the nearest telephone set.

When the user of station $P_j$ speaks into his microphone 1, he amplitude modulates, in the modulator 3, a carrier frequency $F_m$ supplied by the generator 13. The modulated signals thus produced are transmitted through the output 5 and the coupling circuit $C_{je}$ to the cable $A_e$, and arrive at the end $E_2$ thereof. These signals are then converted in the circuit B into a new carrier frequency $F_n$ by heterodyning with the fixed frequency $F_o$ supplied by the oscillator 28, the relationship being such that $F_n = F_o - F_m$. The telephone signals simultaneously transmitted by various telephone sets can be selectively detected due to the use of synchronous demodulation.

The modulated signals of carrier frequency $F_n$ then pass through the cable $A_r$ which distributes them to the $m$ stations and in particular to the station $P_i$ which receives them at 111 and demodulates them if the generator 113 supplies a carrier of the same frequency $F_n$, correctly phased, with the help of the phase-shift device 109, with the carrier of the signals received at the demodulator 106. The speech signals from the set $P_j$ are filtered by the filter 107 and applied to the loudspeaker 108.

In accordance with an identical procedure, the user of the set $P_i$ can supply voice signals through his microphone 101 to the loudspeaker 8 of the station $P_j$.

The programmable generators such as that 13, may in particular be of the known type including a voltage controlled oscillator, a variable frequency divider and a phase-comparator whose output is coupled to the control input of the oscillator; multiples $NF_r$ of the reference frequency $F_r$ may thus be obtained, N being the variable divisor used in the frequency divider.

Correct demodulation is only possible if the carrier frequency of the received signals is the same as that used for demodulation and if the signals satisfy certain phase conditions.

In other words, there are transmitted telephone signal components of the form;

$$A \sin 2\pi ft + AM \sin 2\pi FT \sin 2\pi ft \qquad (1)$$

where A is the amplitude of the carrier signal
M the modulation factor
f the frequency of the carrier signal
F the component frequency.

It is well known that synchronous demodulation includes multiplication of the signals (1) by $\sin(2\pi ft + \phi)$ and makes it possible, at the output of the demodulator and neglecting the $4\pi ft$ terms, to pick off:

$$\frac{A}{2} \cos \phi + \frac{AM}{2} \sin 2\pi FT \cos \phi \qquad (2)$$

The equality of the carrier frequencies of the programmable generators such as 13, and those of the received signals from the corresponding users, is achieved with the help of the reference frequency generator 19 which supplies through the cable $A_e$ a signal the ratio of whose frequency to that of each of the carrier frequencies which can be supplied by these programmable generators 13, or to that of the generator 28, which is fixed, can, in this example, be expressed in the form 1/N where N is a whole number.

More generally, this ratio can be expressed in the form b/c where b and c are whole numbers, if carrier frequencies or/and that of the generator 28 are not a whole multiple of the reference frequency. In this case the reference frequency is divided by b before being applied to the phase comparator, of the programmable generator.

The conversion frequency supplied by the generator 28 is also synchronised by the reference signal delivered by the generator 19 to the circuit B via the end $E_2$ of the cable $A_e$.

As far as the attainment of the phase condition is concerned, the necessity for this being evidenced by the expression (2), from which results that $\cos\phi$ should be sufficiently high, it is well-known technique to provide a phase-shift device such as 9, the adjustment of which is controlled by a device utilizing the voltage $A/2 \cos\phi$ of equation (2) picked off at the output of the demodulator 3 through the low-pass filter 10.

Where a balanced modulator is used, a reduced carrier level of well-defined value is employed in order to enable correct control of the phase-shift devices to be achieved.

The arrangement of the elements shown in the figure is only one of the various possibilities. In particular, the distribution of the reference signal can be effected through the cable $A_r$ to the input of which the generator 19 is then connected.

The low-pass filters such as 2 and 7 are employed to limit the signals which are respectively transmitted and received, to the useful spectrum.

The high-pass filters, such as 4 and 12, make it possible to avoid any disturbances which could be caused by signals of frequency lower than the useful transmitted spectrum, in particular residual voice signals.

If $e$ is the interval between the successive carrier frequencies it is generally accepted that $e$ should be at least equal to 8 kc/s in order to be able to use amplitude modulation to transmit a voice spectrum; a higher value is desirable (12 or 16 kc/s for example) in order to simplify the design of the filters such as 2 and 4.

It is also desirable not to exceed a ratio of 3 between the minimal and maximal frequencies of the carriers which are used, in order to ensure that the third harmonics delivered by the mixer do not coincide with an operating frequency, failing which switchable band-filters would have to be provided and this would reduce the effectiveness of the system described here.

On this basis it is possible, for example, to establish a frequency schedule of 80 carriers spaced at intervals of $e = 12$ kc/s, with a reference frequency of 4 kc/s.

For example, we could have 40 high-band carriers $F_m = 2488 - 12 r$ ($r = 1 \ldots, 40$) constituting a first half-spectrum, and 40 low-band carriers:

$F_n = 1000 + 12 r$ ($r = 1 \ldots, 40$) constituting a second half-spectrum.

The values of the constant terms 1000 and 2488 have been chosen so that the second harmonic of any of the frequencies $F_n$ does not equal a frequency $F_m$.

With each value of r there corresponds a pair of conjugate frequencies $F_m$ and $F_n$. When one of these is transmitted through the cable $A_e$ by a telephone set, the other is transmitted through $A_r$ by the circuit B.

In other words, in the circuit B the high-pass filter 24 transmits the half spectrum of frequencies $F_m$: 2008 to 2476 kc/s, received from $A_e$ through the amplifier-separator 20, to the mixer 25 supplied by the generator 28 whose frequency is fixed at 3488 kc/s in this example, and reconstitutes a half-spectrum of frequencies $F_n$ ranging from 1012 to 1480 kc/s, which is transmitted to the cable $A_r$ through the low-pass filter 26 and the amplifier 27. The reverse conversion operation is obviously performed by means of the circuit constituted by the low-pass filter 21, the mixer 22 and the high-pass filter 23.

The conjugate frequencies $F_m$ and $F_n$ of each of the pairs are then disposed symmetrically in relation to a frequency of 1744 kc/s which is half the conversion frequency.

Thus, 40 pairs of frequencies $F_m/F_n$ are provided, corresponding theoretically to a possible 40 independent and simultaneous conversations between 80 users.

FIG. 2 is a diagram of a telephone set $P_j$ supplemented by auxiliary elements which make it possible to illustrate a simpler mode operation.

Elements which carry the same references as have been used in connection with the set $P_j$ of FIG. 1, are identical thereto and are connected together in an identical way.

The set $P_j$ which is incorporated into a telephone system of the kind shown in FIG. 1, is operated in accordance with the following principles:

Each of the $m$ users can transmit and therefore receive at each of the frequencies in the spectra $F_m$ and $F_n$, as already described in the context of the description of the circuit shown in FIG. 1. However, in accordance with the method of operation chosen here, each telephone set in the rest state, has its programmable generator 13 set to a characteristic frequency, all these frequencies being chosen within one of the half-spectra, for example $F_m$, this yielding the possibility of 20 simultaneous conversations between 40 users in the case of the numerical example chosen earlier, where 40 pairs of conjugate frequencies $F_m$-$F_n$ are provided.

If $F_{mj}$ is the frequency for which the telephone set $P_j$ is set in the rest state, and $F_{mi}$ is that of a set $P_i$, then $P_j$ will ring $P_i$ by shifting from frequency $F_{mj}$ to frequency $F_{ni}$ which, by conversion in the device B, will become $F_{mi}$, thus allowing a conversation between $P_j$ and $P_i$ on the pair of conjugate frequencies $F_{mi}$-$F_{ni}$.

The signalling operations required for this procedure, are performed using two signals;

a service signal constituted by a low frequency tone Z (which can be distinguished from the speech signals) delivered at the output 52 of a service signal generator 41 and added to the voice signals. When emanating from another user, this tone is detected by means of a detector 47 supplied by the demodulator 6 through the low-pass filter 7.

a presence signal $P_r$, characterising the state of transmission of a set through a channel, here for reasons of simplicity coinciding with the received carrier component. It is picked off from the output of the demodulator 6 through the low-pass filter 10 and delivered by a detector device 46, supplying an output signal only when its input signal is above a given threshold.

The keyboard 42 comprises:

call keys CH, numbering 10 for example and marked 0 to 9, which are used to call the desired user by means of a number of depressions equal to the number of digits in the user number, each key depression resulting for example in the transmission of four bits indicative of the depressed keys.

a key R which causes return to the initial rest state, a key T switching to traffic operation after the reception of a call.

A logic circuit 40 is supplied with the information carried by the two above signals, and with that coming from the keyboard 42. It controls the operation of the service signal generator 41, the blocking of the output amplifier 15 through a connection 53, the frequency setting of the carrier generator 13 through a connection 48 by means of the transmission of digital signals translating the position of the call keys CH, and, through connections 50 and 51, the blocking of corresponding amplifiers 45 and 44 which supply the loudspeaker 43 in parallel respectively with voice signals received from the demodulators 6, through the filter 7, and with the tone Z received from the generator 41.

The essential stages of operation are as follows:

Rest state: the set $P_j$ transmits at the frequency $F_{mj}$ via the amplifier 15 which is unblocked by the logic circuit 40, the latter controlling the transmission of the tone Z by the generator 41 and the blocking of the loudspeaker 43. The carrier presence detector 46 is in the stand-by condition.

Calling state: by depressing the keys CH of the keyboard 42, the user of the set $P_j$ controls the logic circuit 40 which sets the generator 13 to $F_{ni}$, inhibits modulation by the signal Z and blocks the amplifier 15 in order not to disturb any traffic between possible users of this frequency.

The presence of a possible signal Z from the called set $P_i$, is tested by the detector 47.

Two cases:

1. The signal Z does not appear at the output of the detector 47: the called set $P_i$ is then assumed to be busy, either as being called or as ringing depending upon whether or not the presence of a carrier is detected at 46. The amplifier 15 remains blocked, the amplifier 45 likewise (in order to ensure privacy of communication) but the amplifier 44 is unblocked in order to transmit the busy signal to the loudspeaker. The busy signal may, for example, be derived from the signal Z through chopping the latter.

2. The signal Z is detected: the amplifier 15 is unblocked and the generator 13 transmits the pure carrier $F_{ni}$. The set $P_i$ detects the presence of this carrier by means of its own detection device which is identical to that 46 of station $P_j$, this placing it in the called condition. Its loudspeaker is unblocked and retransmits a locally generated audio ringing signal. The modulation of its carrier by the tone Z is then suppressed by its logic circuit in order to indicate it as busy vis-a-vis other sets than $P_j$. This is substituted by modulation by the audio ringing signal in order to create a ringing acknowledgment.

Starting state.

The suppression of the signal Z supplied by the set $P_i$ is detected by the device 47 in the set $P_j$ whose amplifier 45, then unblocked, allows the loudspeaker to reproduce the received modulation. The user hears the ringing acknowledgement and then waits for $P_i$ to speak. Normally, the latter does this after having operated his keyboard by depressing the key T thereof (this suppressing ringing tone and ringing acknowledgment.)

If the user of $P_i$ is absent or does not replay, user of $P_j$ will lose patience and depress key R on his keyboard, thus returning his set to the rest state.

If the called user $P_i$ does not wish to reply, and wants to become free again, be eliminates the ringing signal by returning his station to the rest state (key R), causing the busy signal to be produced at the set $P_j$ whose user has no alternative but to follow suit.

The hereinabove described procedure also makes it possible to connect the users to an external network.

This connection can be performed, by means of an operator, using network junctions connected to the artery and designed in an identical manner to the other telephone sets already described.

If $q$ network junction devices are provided, the number of telephone sets will be reduced to $m-q$ unless the following solution is resorted to:

The $q$ pairs of frequencies required can be reduced to $q$ new frequencies by the utilisation, as a variant method, of the following arrangements:

The network junction devices are connected in the neighbourhood of the circuit B; the connection, to the cables of the artery, of their modulating and demodulating circuits is reversed in relation to that of the telephone stations; and the $q$ frequencies in question are choosen outside the spectrum $F_m$–$F_n$ and do not pass trough the circuit B. However, the programmable generators of each of the $m-q$ telephone sets must of course be capable of supplying each of these $q$ new frequencies.

Whether or not this variant embodiment is employed, the programmable generator of each network junction will at all times (and therefore in any state), be set to a fixed frequency which is different from those of all the other telephone sets or network junctions.

From the operating point of view, when a user wishes to be connected to are external network, the above described arrangements require him to ring them one by one until he finds one free. It is possible to simplify this procedure by arranging for the logic circuit 40 to control, by means of a special key X on the keyboard 42, a known kind of automatic search, for example by the automatic and successive stepping of the programmable generator associated with each telephone set, to each of the frequencies assigned to the junctions, until a free one is encountered suitable as already indicated for a call between users.

This description of the operation of the system is only one example of many other possible arrangements utilizing the operating principles described here, and based upon the assignment of a distinct frequency pair to every set.

It involves limiting the number of users to half the number of carrier frequencies, since the callers abandon their rest frequencies without them being reutilized by others. However, such an arrangement has the advantage that it does not require a central supervisory station.

If such a station is used, it is possible not to restrict to a given frequency the carrier frequency which has to be used for calling a given user; any free one of the $n$ pairs of conjugate frequencies provided for communication between two users will then be assigned on request for such a communication by the central supervision station. In addition to these n pairs, a limited number, $k$, of frequency pairs will be provided for communication between the users and the central supervision station. The frequency of each one of the $k$ pairs, for example the lower one, is used for the programmable generators of the users, one of these lower frequencies being assigned to each one either in the rest state or for calling the central supervisory station. $k$ depends upon the number of users and may be reduce to unity for a dozen of them.

In this latter procedure, a user will call no longer directly another user, but call, on his rest frequency, the central supervisory station.

The latter assigns a frequency pair to the two communicating uses and remotely controls their programmable generators. The users may only tune them on their rest frequency to interrupt a conversation or call the central supervisory station.

Likewise, if a user wants a communication with an external network, the central supervisory station remotely controls his programmable generator on the lower frequency of the frequency pair associated with a free network junction, and may connect the caller to a numbering translator for directly calling the desired subscriber of the external network.

All these operations are possible, as in the preceding example, with a presence signal and tune frequencies included in the telephone speech frequency band.

In comparison with the operating principle described before, the "pooling" of the frequencies used in this latter system makes it possible to provide a substantially larger number of users than the number of frequencies, in a ratio which of course is a function of the degree of utilisation of the sets by their users, that is to say that if K is the total number of pairs of carrier frequencies used in the system, it may be substantially less than the number $m$ of telephone sets or network junction devices, even taking into account the $k$ waiting channels.

The various operating principles described and the methods of putting them into effect which have also been indicated, are only a few examples among the numerous other possible avenues which may be suggested by other known telephone systems, and have been provided simply in order to illustrate the significance of the invention.

Of course, the invention is not limited to the embodiments described and shown which were given solely by way of example.

What is claimed is:

1. A telephone set having first and second inputs and an output, and comprising a transmitter channel for delivering to said output a variable carrier frequency output signal with double side-band amplitude modulation and carrier component and a receiver channel having an input coupled to said telephone set first input for receiving a multiplex high frequency signal including, when said set is being used for communication, a multiplexed signal having the same carrier frequency as said output signal [,] with double side-band amplitude modulation and carrier component;

said transmitter channel comprising: a programmable generator having an output, for supplying said output signal variable carrier frequency, and a sync input; and an amplitude modulator having a first input for receiving voice signals from a microphone, a second input and an output; said sync input being coupled to said second input of said telephone set for receiving a reference frequency, said second input of said modulator being coupled to said generator output, and said modulator output being coupled to said telephone set output;

said receiver channel comprising: an electroacoustic transducer, a synchronous demodulator having a first input coupled to said receiver channel input for receiving said multiplex high frequency signal, a second input and an output for delivering to said transducer the modulating signal from said multiplexed signal and a control voltage; and a variable phase-shifter having a signal input coupled to said generator output, a control input coupled for receiving said control voltage and an output coupled to said demodulator second input.

2. A telephone system comprising m telephone sets as claimed in claim 1, m being an integer greater than 2, and a two-way telephone artery comprising: first and second cables having respective inputs and outputs; means for coupling the outputs of said m telephone sets to said first cable, their first inputs to said second cable and their second inputs to one of said cables; a reference frequency generator having an output coupled to the input of said one cable; a frequency converter device, having an input coupled to the output of said first cable and an output coupled to the input of said second cable, for converting each component of its input signal into the frequency $F_o - f$, where $F_o$ is a fixed frequency, and $f$ the frequency of the considered component; said frequency $F_o$ and the carrier frequencies delivered by the programmable generator of said $m$ sets being chosen so that in relation to said reference frequency they are in a ratio $b/c$ where $b$ and $c$ are whole numbers, said carrier frequencies being distributed in two half-spectra such that any frequency $F_m$ of either of the two half-spectra is obtained by subtracting from said frequency $F'_o$ a frequency $F_n$ from the other half-spectrum, two frequencies $F_m$ and $F_n$ such that $F_m + F_n = F_o$ being hereinafter referred to as conjugate frequencies.

3. A telephone system as claimed in claim 2 wherein each of said programmable generators is set, during rest condition, to a predetermined frequency characteristic of said set, belonging to either one of said half-spectra, communication between a calling set and a called set being established by the user of said calling set by the adjustment of the programmable generator of his set to the frequency conjugate of the characteristic frequency of the called set.

* * * * *